US012301472B2

(12) United States Patent
Bhandarkar et al.

(10) Patent No.: US 12,301,472 B2
(45) Date of Patent: May 13, 2025

(54) REQUEST THROTTLING USING PI-ES CONTROLLER

(71) Applicant: Oracle International Corporation, Redwood Shores, CA (US)

(72) Inventors: Raghuveer Murari Bhandarkar, Bangalore (IN); Ravijeet Ranjit Kumar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/407,910

(22) Filed: Aug. 20, 2021

(65) Prior Publication Data
US 2023/0057068 A1 Feb. 23, 2023

(51) Int. Cl.
*H04L 47/62* (2022.01)
*H04L 43/16* (2022.01)
*H04L 47/56* (2022.01)
*H04L 47/625* (2022.01)

(52) U.S. Cl.
CPC .......... *H04L 47/6225* (2013.01); *H04L 43/16* (2013.01); *H04L 47/562* (2013.01); *H04L 47/6255* (2013.01)

(58) Field of Classification Search
CPC ... H04L 47/6225; H04L 43/16; H04L 47/562; H04L 47/6255
See application file for complete search history.

(56) References Cited

U.S. PATENT DOCUMENTS

| 11,032,392 | B1* | 6/2021 | Gabrielson | G06F 9/45558 |
| 2005/0147030 | A1* | 7/2005 | Lenzini | H04L 47/24 370/229 |
| 2013/0173803 | A1* | 7/2013 | Pijewski | G06F 9/5072 709/226 |
| 2017/0186030 | A1* | 6/2017 | Jiang | G06N 20/00 |
| 2020/0127911 | A1* | 4/2020 | Gilson | H04L 43/0847 |
| 2020/0162385 | A1* | 5/2020 | Thiagarajan | H04L 45/74 |
| 2020/0366608 | A1* | 11/2020 | Pan | H04W 52/26 |

(Continued)

OTHER PUBLICATIONS

Simple Exponential Smoothing, https://otexts.com/fpp2/ses.html, 8 pages from the book "Forecasting Principles and Practice" by Rob. J. Hyndman. (Year: 2018).*

(Continued)

*Primary Examiner* — Harry H Kim
(74) *Attorney, Agent, or Firm* — Kilpatrick Townsend & Stockton LLP

(57) ABSTRACT

Techniques for providing request throttling using proportional, integral, and exponential smoothing algorithms are disclosed. A distributed computing system can include a throttler engine that receives a plurality of requests targeting a software component within the distributed computing system. The throttler engine can aggregate the requests into a queue based on a time window. The throttler engine can determine a received request rate and a request rate limit for the software component and then compute a throttled request rate. The throttled request rate can include correction terms derived from proportional and integral computations and a correction term obtained from an exponential smoothing algorithm. The throttler engine can then provide throttled requests from the queue to the software component.

20 Claims, 11 Drawing Sheets

(56) References Cited

U.S. PATENT DOCUMENTS

| | | | |
|---|---|---|---|
| 2021/0234890 A1* | 7/2021 | Bansal | H04L 63/0227 |
| 2021/0250299 A1* | 8/2021 | Liu | H04L 47/125 |
| 2022/0022066 A1* | 1/2022 | Anand Pushkala | H04L 41/147 |
| 2022/0086090 A1* | 3/2022 | McQuaid | H04L 43/0864 |
| 2023/0305892 A1* | 9/2023 | Mathew | H04L 41/5025 |
| 2024/0078428 A1* | 3/2024 | Zhou | G06N 3/08 |

OTHER PUBLICATIONS 7.1 Simple Exponential Smoothing, Available Online at: https://otexts.com/fpp2/ses.html, 8 pages.

What is a PID Controller : Working & Its Applications, ELPROCUS, Available Online at: https://www.elprocus.com/the-working-of-a-pid-controller/, 16 pages.

Desgats, How We Built Rate Limiting Capable of Scaling to Millions of Domains, The Cloudflare Blog, Available online at: https://blog.cloudflare.com/counting-things-a-lot-of-different-things/, Jun. 7, 2017, 14 pages.

* cited by examiner

REQUEST THROTTLING USING PI-ES CONTROLLER

BACKGROUND

Cloud-based platforms are increasingly common for providing software applications to numerous clients, including both users and other systems. A cloud computing environment may make available software components of one or more applications. Clients can make requests targeting the software components, with requests numbering several thousand requests per second from potentially thousands of users. Conventional techniques for rate-limiting client requests apply simple mechanisms for buffering incoming requests to a target component, which fail to take into account dynamic changes in the incoming request stream. Thus, there is a need for robust throttling of client requests that can adapt to handle bursts in request traffic and other dynamic changes to the client requests.

BRIEF SUMMARY

Embodiments of the present disclosure relate to throttling requests in a cloud computing environment. More particularly, some embodiments provide methods and systems that implement a throttler engine in a distributed computing system. The throttling can be based on process control similar to that found in conventional proportional-integral-derivative (PID) controllers. To provide additional robustness when throttling request traffic with high volume bursts, embodiments of the present disclosure include an exponential smoothing algorithm as a component of the throttler engine.

One embodiment is directed to a method performed by a throttler engine in a distributed computing system. The method can include receiving a plurality of requests to use a software component. Each request can have an associated request time identifying when the request was made or received by the throttler engine. The throttler engine can aggregate a subset of the received plurality of requests into a queue based on a time window. The queue may be a first in first out (FIFO) queue, in some embodiments. The time window can have a specific length (e.g., 100 ms). The subset thus includes the received requests that have request times falling within the time window. Because the time window has a known length, the throttler engine can determine a received request rate based on the number of requests received during the time window. Additionally, the throttler engine can identify a request rate limit associated with the software component. The request rate limit can be associated with the time window and may be a static request rate limit.

Based on the received request rate and the request rate limit, the throttler engine can compute a plurality of correction values, each corresponding to a weight of a plurality of weights. The weights may be predetermined values used when computing the correction values. The throttler engine can combine the correction values to determine a throttled request rate. One, two, or three correction values may be used in computing the throttled request rate. The throttled request rate may indicate a number of requests to be passed to the software component. The throttler engine can identify one or more requests of the queued subset based on the throttled request rate. The requests identified by the throttler engine can be passed to the software component.

In some embodiments, the throttler engine can further aggregate a second subset of the plurality of requests based on a second time window. The second time window may be the same length as the time window or may have a different length. As with the first subset, the throttler engine can determine a second received request rate based on the second time window. The second received request rate can be used to update the plurality of correction values, which in turn can be used to update the throttled request rate. The updated throttled request rate can be used to identify requests from the second subset to be passed to the software component.

In some embodiments, computing the plurality of correction values includes computing a proportional correction value, an integral correction value, and a smoothed correction value. The proportional correction value may be based on a first difference between the received request rate and the request rate limit and a proportional weight of the plurality of weights. The integral correction value may be based on the first difference, a second difference between the second received request rate and the request rate limit, and an integral weight of the plurality of weights. The smoothed correction may use an exponential smoothing algorithm and can be based on the first difference, the second difference, and a smoothed weight.

The plurality of weights can be tuned based on a predicted request rate, in accordance with certain embodiments. Tuning the plurality of weights may occur when the throttler engine is first provisioned within the distributed computing system. The plurality of weights can also be re-tuned. The throttler engine may detect a drift in a deviation between the predicted request rate and the received request rate and a subsequent deviation between the predicted request rate and the second received request rate. If the drift exceeds a threshold, the throttler engine can re-tune the plurality of weights based on a new predicted request rate. The new predicted request rate may be based on the second deviation. Tuning can include hyperparameter tuning.

Another embodiment is directed to a distributed computing system including one or more processors and one or more memories storing computer-executable instructions that, when executed with the one or more processors, cause the distributed computing system to receive a plurality of requests to use a software component, aggregate a subset of those requests into a queue, determine a received request rate and a request rate limit, and compute a plurality of correction values. The correction values are each associated with one or more weights of a plurality of weights. The instructions may also cause the distributed computing system to combine the plurality of correction values to determine a throttled request rate, identify one or more throttled requests from the aggregated subset based on the throttled request rate, and provide the throttled request to the software component.

In other embodiments, the instructions can further cause the distributed computing system to aggregate a second subset of the plurality of requests based on a second time window. The second time window may be the same length as the time window or may have a different length. The instructions can further cause the throttler engine of the distributed computing system to determine a second received request rate based on the second time window, update the plurality of correction values based on the second received request rate, and update the throttled request rate based on the updated correction values. The updated throttled request rate can be used to identify requests from the second subset to be passed to the software component.

In still other embodiments, computing the plurality of correction values includes computing a proportional correction value, an integral correction value, and a smoothed correction value. The proportional correction value may be based on a first difference between the received request rate and the request rate limit and a proportional weight of the plurality of weights. The integral correction value may be based on the first difference, a second difference between the second received request rate and the request rate limit, and an integral weight of the plurality of weights. The smoothed correction may use an exponential smoothing algorithm and can be based on the first difference, the second difference, and a smoothed weight.

In accordance with certain embodiments, the instructions can further cause the distributed computing system to tune the plurality of weights based on a predicted request rate, detect a drift in a deviation between the predicted request rate and the received request rate and a subsequent deviation between the predicted request rate and the second received request rate, and, responsive to a determination that the drift exceeds a threshold, re-tune the plurality of weights based on a new predicted request rate. The new predicted request rate may be based on the second deviation. Tuning can include hyperparameter tuning.

Yet another embodiment is directed to a computer-readable medium storing computer-executable instructions that, when executed by one or more processors, cause a distributed computing system to receive a plurality of requests to use a software component, aggregate a subset of those requests into a queue, determine a received request rate and a request rate limit, and compute a plurality of correction values. The correction values are each associated with one or more weights of a plurality of weights. The instructions may also cause the distributed computing system to combine the plurality of correction values to determine a throttled request rate, identify one or more throttled requests from the aggregated subset based on the throttled request rate, and provide the throttled request to the software component.

In other embodiments, the instructions can further cause the distributed computing system to further aggregate a second subset of the plurality of requests based on a second time window. The second time window may be the same length as the time window or may have a different length. The instructions can further cause the distributed computing system to determine a second received request rate based on the second time window, update the plurality of correction values based on the second received request rate, and update the throttled request rate based on the updated correction values. The updated throttled request rate can be used to identify requests from the second subset to be passed to the software component.

In still other embodiments, computing the plurality of correction values includes computing a proportional correction value, an integral correction value, and a smoothed correction value. The proportional correction value may be based on a first difference between the received request rate and the request rate limit and a proportional weight of the plurality of weights. The integral correction value may be based on the first difference, a second difference between the second received request rate and the request rate limit, and an integral weight of the plurality of weights. The smoothed correction may use an exponential smoothing algorithm and can be based on the first difference, the second difference, and a smoothed weight.

In accordance with certain embodiments, the instructions can further cause the distributed computing system to tune the plurality of weights based on a predicted request rate, detect a drift in a deviation between the predicted request rate and the received request rate and a subsequent deviation between the predicted request rate and the second received request rate, and, responsive to a determination that the drift exceeds a threshold, re-tune the plurality of weights based on a new predicted request rate. The new predicted request rate may be based on the second deviation. Tuning can include hyperparameter tuning.

DETAILED DESCRIPTION

Figure 1:
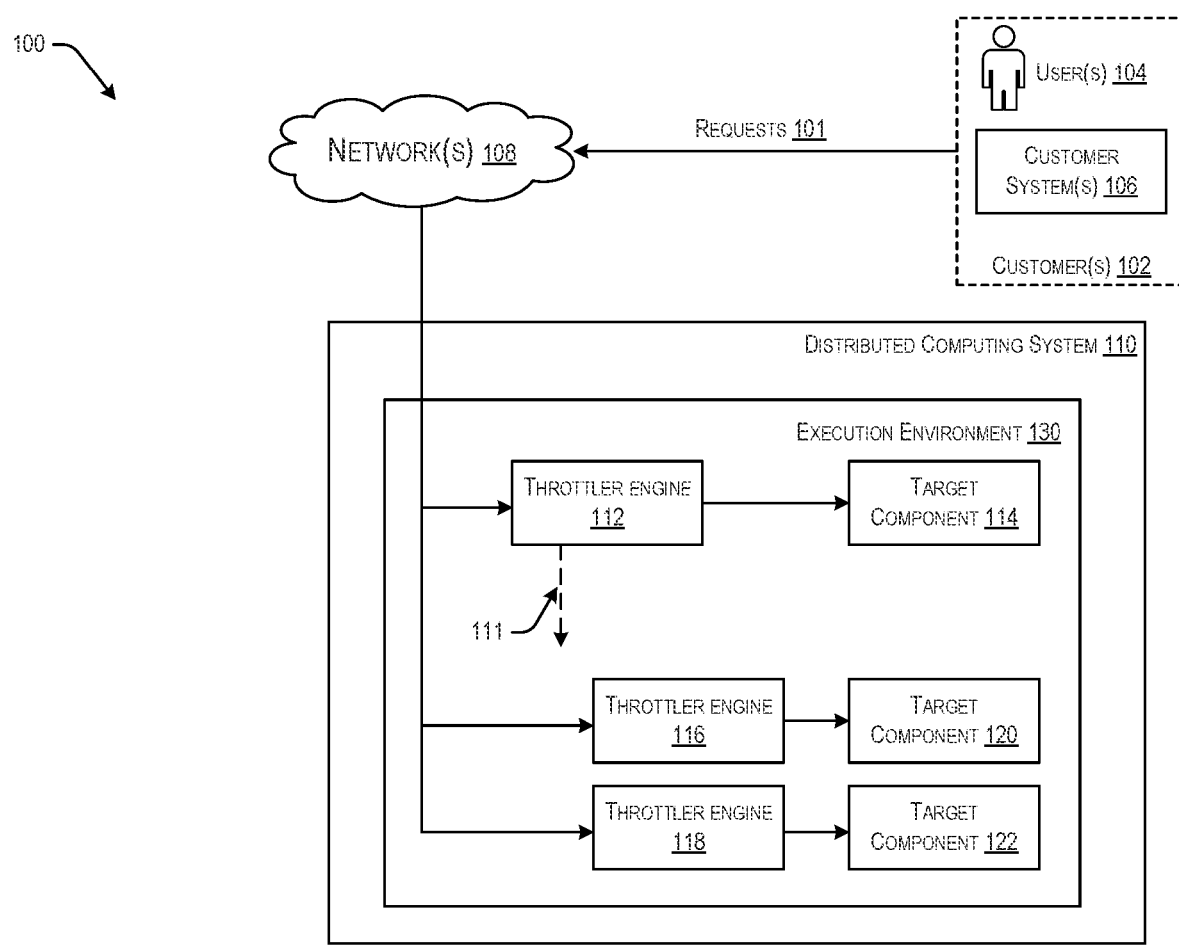
FIG. 1 depicts an exemplary distributed computing system implementing a throttler engine according to some embodiments.

In the following description, for the purposes of explanation, specific details are set forth in order to provide a thorough understanding of certain embodiments. However, it will be apparent that various embodiments may be practiced without these specific details. The figures and description are not intended to be restrictive.

Distributed computing systems, including cloud-based platforms and other cloud computing systems, have become increasingly common for providing software applications to multiple different clients (e.g., customers, users, tenants, etc.). In a cloud computing environment, a software resource (e.g., software application, application instance, software component, etc.) may receive numerous requests to access, use, or otherwise interact with the resource. In many cases the requests can be high volume, such that the software component receives several thousand requests per second. Additionally, any single software component may be the target of requests from any number of customers. Because processing or otherwise acting on the requests can require significant computing resources, a software component may be unable to handle requests that arrive in excess of an upper rate limit. In other words, to preserve functionality for as many customers as possible, the software component may need to reject or ignore a portion of the requests received in order to be able to effectively process the other received requests.

Distributed computing systems traditionally employ rate limiting techniques to protect the functionality of software components that may be subject to high volumes of requests. The conventional methods include leaky bucket algorithms or sliding window algorithms that can reject a certain fraction of incoming requests to a software component to keep the received request rate below the upper limit of the component. However, these conventional methods are often unnecessarily restrictive and fail to efficiently handle rapid changes in the request rates (e.g., "bursty" requests). Techniques disclosed herein are directed to methods, systems, and computer-readable storage media for providing a throttling engine (also referred to herein as a throttler engine) for software components that incorporates robust proportional and integral rate control combined with a predictive algorithm to handle highly variable request rates while maintaining the most efficient request throughput.

A distributed computing system may include a computing cluster of connected nodes (e.g., computers, servers, virtual machines, etc.) that work together in a coordinated manner to handle various requests (e.g., use of a software component or application, storage and retrieval of data in a system that maintains a database, queries, etc.) by any suitable number of tenants. A "computing node" may include a server, a computing device, a virtual machine, or any suitable physical or virtual computing resource configured to perform operations as part of a computing cluster. The computing nodes can provide one or more execution environments for executing or hosting a software application, software instance, software component, or the like.

As used herein, a software component can refer to any software application, instance, process, task, or the like that is configured to receive and process requests to use, access, or otherwise interact with the component. For example, the software component can be a forecasting service provided as part of a suite of cloud services. The forecasting service can receive requests to process and analyze historical user data to forecast future workloads and capacities. Such a forecasting service may be available to a large number of customers of the distributed computing system, including external tenants (e.g., customers of the forecasting service) and internal services (e.g., workforce forecasting services, capacity planning services, etc.). Because the forecasting service may provide computationally intensive responses to requests, it can have an upper limit on the rate of requests it is able to receive and process. In general, the techniques disclosed herein are applicable to any software component for which rate limiting is desired.

A distributed computing system can include a throttler engine to provide rate limiting for a software component. The throttler engine can itself be a process or application executing in the execution environment of the distributed computing environment. In some embodiments, the throttler engine can be "close" to the customers or other users of the distributed computing system, e.g., near the edge of the system. For example, the throttler engine can be part of a gateway (e.g., an application programming interface (API) gateway) or API server that receives user requests and transmits them to one or more software components. In some embodiments, each software component is associated with a throttler engine instance, such that each software component can have a specific throttling configuration. In other embodiments, the throttler engine can be a larger application including multiple sub-engines, where all or a portion of the received requests are received at the throttler engine, throttled as appropriate for the corresponding software component, and transmitted to the corresponding software component.

Throttling of user requests can be accomplished via a control process configured to minimize the difference between a received request rate and a request rate limit. The request rate can be the number of requests received in a time period or time window, divided by the magnitude of that time period, and given as requests per second. For example, if 30 requests are received in a 100 ms time period, the received request rate is 300 requests per second during the time period. The request rate limit can be a known or received parameter of the software component and may represent the maximum number of requests that the software component is able to process in a given period of time. The request rate limit may be a static request rate limit. For example, the software component may have a request rate limit of 400 requests per second. During subsequent time windows, the software component may receive a different number of requests. Depending on the number of requests received and the size of the time window, the received request rate can vary significantly from one time window to the next.

Requests that target a software component can be aggregated by the throttler engine and queued. The queuing can be based upon a time window of a predetermined length. Requests received during a first time window can be stored in a queue. During a subsequent second time window, additional requests may be received and queued. The aggregation can proceed continuously in real time. The queue can be sized to store a sufficient number of requests to allow the throttling computations to occur with minimal latency between the requesting customer and the software component. In some embodiments, the queue is a first in first out (FIFO) queue. For example, during the first time window the throttler engine may receive 10 requests. The throttler engine can store the 10 requests in the queue and perform the throttling control computation to determine how many of the requests are to be passed to the software component. Subsequently, during the second time window, the throttler engine can receive 40 requests, which may be queued behind the 10 requests received during the first time window. At each time window, the throttler engine can compute a throttled request rate. Based on the throttled request rate, the throttler engine can identify a portion of the queued requests to pass on to the software component. The requests not passed to the software component may represent requests in excess of the upper limit of requests that the software component can handle. These excess requests may be dropped. In some embodiments, the distributed computing system may handle the dropped requests by returning an indication to the requesting customer that a request was dropped or throttled. As requests are passed to the software component, the requests are cleared from the queue, and later queued requests advance to the front of the queue.

To provide the process control, the throttler engine may incorporate proportional and integral corrections to the received request rate to determine the throttled request rate, similar to features of a proportional-integral-derivative (PID) controller known from the industrial arts. The throttler engine can provide request throttling by computing the throttled request rate based on the difference between the received request rate and the request rate limit. As with a typical PID controller, for a current time window the throttler engine can compute a proportional correction that is proportional to the difference during the time window and an integral correction that is proportional to an integral sum of the current difference and previous differences computed for earlier time windows. For example, the proportional correction may be represented as $C_P=K_P \cdot E(t)$, where $C_P$ is the proportional correction, $K_P$ is a proportional weight (also referred to as a gain), and E(t) is the difference between the received request rate and the request rate limit at time "t." Similarly, the integral correction may be represented as $C_I=K_I \int_0^t E(\tau)d\tau$, with $C_I$ is the integral correction, $K_I$ is the integral weight, and $\int_0^t E(\tau)d\tau$ is the integral of the difference from some initial time t=0 to time "t." The integral can be computed via several different techniques for numerical or analytic integration. Numerical integration techniques typically approximate the integral with a weighted sum of the value at the current time window and the values at one, two, three, or more prior time windows. In addition, the time domain over which the integral of E(t) is accumulated may vary and not begin from a fixed t=0. For example, the integral value may only be accumulated over the previous 10 time windows. One skilled in the art would recognize numerous variations of the computational methods for determining the integral value.

Unlike a PID, which includes computing a derivative correction, the throttler engine may instead provide a smoothed correction factor. The typical derivative factor of a PID is used to provide some element of predictive control over expected future values of the controlled input value. However, in many PID applications, a derivative correction can introduce poor control and high variability to controller stability. In the context of request throttling, instability can result in excessive and unnecessary throttling. A smoothed correction can provide similar predictive effects as a derivative correction while substantially limiting the potential for instability. As an example, the smoothed correction factor may be represented as $C_{ES}(t+1)=\alpha \cdot E(t)+\alpha(1-\alpha) \cdot E(t-1)+\alpha(1-\alpha)^2 \cdot E(t-2)+ \ldots$, where $C_{ES}(t+1)$ represents the predicted estimate of E(t+1), the difference between the received request rate during the next time window, and $\alpha$ represents a smoothed weight. For $0 \leq \alpha < 1$, the contribution of earlier difference terms will decrease exponentially toward zero. Additionally, the exponential smoothing computation can be truncated so that the computation only includes a certain number of previous terms from earlier time windows. For example, the exponential smoothing computation may only include the previous 10 time windows. Other variations of the exponential smoothing computation are contemplated herein, including those that involve additional weight factors.

The throttler engine can combine the computed proportional, integral, and smoothed correction values to obtain the throttled request rate. In some embodiments, the throttler engine can use one, two, or all three correction values to determine the throttled request rate. In other embodiments, the configuration of correction values used to determine the throttled request rate can be changed in response to changes in the request traffic to the software component. For example, the throttler engine may begin by computing the throttled request rate using only the proportional correction and integral correction. An increase in high-volume bursts of request traffic can indicate that the throttler engine should begin to use the exponential smoothing factor in the determination of the throttled request rate.

The proportional weight $K_P$, the integral weight $K_I$, the smoothed weight $\alpha$, and other weight factors can be selected using a tuning process. In some embodiments, the tuning process is a hyperparameter tuning or other machine learning optimization process. In hyperparameter tuning, the values of the plurality of weights can be tuned based on a grid search over a parameter space of possible weights, using as inputs predicted request rates based on simulated request traffic patterns. For example, the plurality of weights can be tuned using historical request rate data (e.g., historical traffic data) for a software component. Based on the historical request rate data, the hyperparameter search can select weights, compute an output request rate, and repeat to identify the optimal weights. As mentioned briefly above, the throttler engine can include a tuning module with the ability to monitor the real-time received requests (e.g., current traffic) and identify changes or drift to the received request rate. If the drift exceeds a threshold, the tuning module can determine new weight values to use for the throttling computation. Because the throttler engine is implemented in software, the tuning simulations can be performed without impacting the throttler engine's functionality, and new weights can be introduced while the throttler engine is operating.

Implementing a throttler engine with both the proportional and integral correction of a PID and the smoothed correction of a predictive exponential smoothing algorithm provides numerous advantages over conventional rate limiting. Techniques like leaky bucket, token bucket, and sliding window do not provide robust predictive control of future request traffic based on past traffic patterns. In a leaky bucket algorithm, the output data (e.g., the throttled rate) is fixed and constant. The "bucket" may queue a certain number of input data (e.g., received requests), but cannot adapt to incoming data that exceeds a particular average rate or which has high volume in excess of the bucket's capacity. In a token bucket algorithm, the "bucket" is instead a store of count values ("tokens") corresponding to the smallest units of output data. Tokens are added to the bucket at a constant rate and then deducted in correspondence to the size of the output data stream (e.g., the number of throttled requests). Although the token bucket allows for variable output data rates, it suffers the same sensitivity to high volume "bursty" traffic inputs and does not allow adaptation of the token collection rate. In the more sophisticated sliding window algorithm, the time window used to calculate the received request rate is allowed to advance across the time windows for which incoming requests are collected and queued, which can smooth the received request rate for traffic bursts that occur in one time window but not adjacent time windows. The drawback is that the sliding window computation can result in insufficient throttling in response to sudden increases in traffic as well as excessive throttling in the opposite case, when traffic suddenly decreases in volume. For example, a burst of requests may occur near the boundary of adjacent time windows. For request traffic that is frequently "bursty," the sliding window algorithm's smoothing can be inadequate at throttling the requests for each successive time window.

By contrast, the techniques disclosed herein provide throttling that adapts to changing request traffic patterns, that provides automatic control of the throttled request traffic, and that can be re-tuned automatically without halting the throttling functionality. In particular, the predictive effect of the exponential smoothing computation can allow the throttler engine to begin throttling requests in excess of the software component's limit in advance of receiving a predicted increase in request traffic. Moreover, machine learning techniques can also be employed to tune and re-tune the throttler engine in response to a detected drift in the received request traffic, reducing throttler engine downtime eliminating the need for lengthy manual configuration using traditional heuristic methods.

FIG. 1 depicts an distributed computing system 110 in a cloud computing environment 100 that includes one or more throttler engines providing rate limiting to one or more target software components. The distributed computing system 110 may be implemented by one or more computing systems that execute computer-readable instructions (e.g., code, program) to implement the distributed computing system. As depicted in FIG. 1, the distributed computing system 110 includes various systems including an execution environment 130, throttler engine 112, target component 114, and additional throttler engines 116, 118 and target components 120, 122. The systems depicted in FIG. 1 may be implemented using software (e.g., code, instructions, programs) executed by one or more processing units (e.g., processors, cores) of a computing system, hardware, or combinations thereof. The software may be stored on a non-transitory storage medium (e.g., on a memory device).

The distributed computing system 110 may be implemented in various different configurations. In the embodiment shown in FIG. 1, the distributed computing system 110 may be implemented on one or more servers of a cloud provider network. In some embodiments, an execution environment (e.g., execution environment 130) may represent an environment (e.g., a "client" node(s), host node(s), etc.) for executing any number of software applications, software instances, processes, or other programs, including target components 114, 120, and 122. Different execution environments may be associated with a tenant (e.g., a customer). Although not depicted in FIG. 1, customer(s) 102 can represent one or more tenants of the distributed computing system 110. Each tenant may be associated with one or more execution environments. An execution environment may be configured to perform operations in a coordinated fashion utilising any suitable number of computing nodes. A "computing node" (also referred to herein as a "node") may include a server, a computing device, a virtual machine, or any suitable physical or virtual computing resource configured to perform operations as part of the execution environment.

In some embodiments, customer(s) 102 can interact with the distributed computing system 110 via any suitable computing device, interface, or system. Customer(s) 102 can include user(s) 104 and customer system(s) 106, which can include other services, applications, programs or the like interacting with (or as part of) the distributed computing system 110. Customer interactions can take the form of requests 101. The requests 101 can include various types of software requests including API calls, remote procedure calls, SQL queries, or other requests to access, use, or otherwise interact with a software component. The requests 101 can be transmitted to (or within) the distributed computing system 110 via one or more network(s) 108 (e.g., the Internet or other public network). Although not shown in FIG. 1, requests 101 may be received at a gateway within the distributed computing system 110, which can pass the requests to a server (e.g., a proxy service or API server) that is ultimately responsible for directing the requests to the target software components.

As an example, one or more users (e.g., user(s) 104) can transmit a plurality of requests (e.g., requests 101) targeting a software component (e.g., target component 114). The requests can be, for example, a series of requests to process data, with each request providing instructions for target component 114 to retrieve, process, and store data. A throttler engine 112 can be configured to intercept, queue, and throttle requests 101 that are transmitted to target component 114. Throttled requests can be passed to target component 114. Requests that are not passed to the software component may be dropped by the throttler engine 112 as dropped requests 111. Throttler engine 112 can provide throttling based upon a rate limit corresponding to target component 114, which may be a fixed value or may change depending on the configuration of target component 114 or distributed computing system 110. For instance, a change to the resources provisioned for target component 114 could result in a change (e.g., reduction or increase) in the request rate that target component 114 is able to handle. Specific details of the operation of the throttler engine 112 is given below with respect to FIG. 2.

The distributed computing system 110 can implement additional throttler engines 116, 118 that correspond to target components 120, 122, respectively. As noted previously, each software component for which throttling or rate limiting is desired can have a corresponding throttler engine. The throttler engines may be implemented as distinct processes in the execution environment 130. In some embodiments, the distributed computing system 110 may host the throttler engines in a distinct execution environment or other node or nodes of the distributed computing system 110. In some embodiments, the throttler engines for multiple software components may be included in a single throttler engine that consolidates the throttler engines for each software component as separate sub engines.

Figure 2:
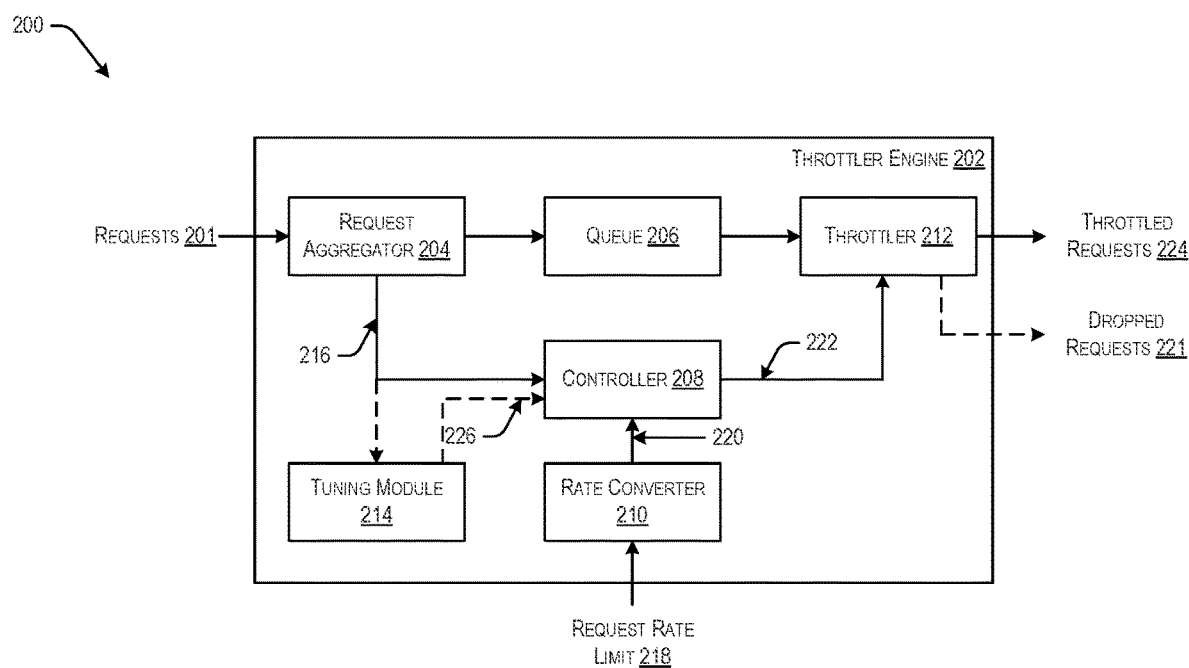
FIG. 2 is a block diagram of a throttler engine according to several embodiments.

FIG. 2 illustrates a throttler engine 202 for throttling requests 201 for a software component, according to several embodiments. The throttler engine 202 may be similar to throttler engine 112 described with respect to FIG. 1. The throttler engine 202 may include a request aggregator 204, a queue 206, a throttler 212, a controller 208, and a rate converter 210. The throttler engine 202 may be configured to intercept requests 201 made from one or more customers or tenants of a distributed computing system, including customer(s) 102. Configuration parameters of the throttler engine 202 may be stored in a cache or other memory (not shown) associated with the throttler engine 202 within the distributed computing system.

The request aggregator 204 can collect requests 201. The requests 201 may each be associated with a request time (e.g., time stamp). The request time may be included as a piece of data with the request or may be determined by the request aggregator 204 based upon the arrival time of the request at the request aggregator 204. In some embodiments, the request aggregator 204 may provide collation or other sorting methods on the received requests 201 such that requests having identical request times are distinguished (e.g., ordered) for placement into a sequential queue. In other embodiments, the queue 206 may be configured to store and handle requests with identical request times without determining an order for the requests.

The request aggregator 204 can collect requests 201 based on one or more time windows. A time window may represent a fixed time duration. Each time window can have the same duration or length. In some embodiments, time windows may have varying lengths, for example, if the configuration of the throttler engine 202 is modified. Additionally, some computations for determining a throttled request rate may be possible with varying time window lengths (e.g., performing numerical integration over discrete time steps of differing values). For the purposes of example herein, the time windows can be described as having equal lengths (e.g., 100 ms).

For a first time window T1, the request aggregator 204 can collect all requests 201 that have a request time that falls within the time window T1. These requests can represent a subset of the requests 201. Based upon the number of requests received, the request aggregator 204 can determine a received request rate 216. For example, during the time window T1, the request aggregator 204 can determine a first received request rate corresponding to time window T1 (e.g., the number of received requests divided by the length of the time window T1). The received requests can be sent to the queue 206 for temporary storage while the throttler engine 202 performs throttling operations. After aggregating the received requests for time window T1, the request aggregator 204 can aggregate requests for the next time window T2, with the requests having request times falling within time window T2. The request aggregator 204 can compute a second received request rate based on the number of requests received for the time window T2. Similarly, the request aggregator 204 can proceed for a third time window T3 and determine a third received request rate corresponding to time window T3, and so on.

The queue 206 may store the aggregated requests sent by request aggregator 204. In some embodiments, the queue 206 is a FIFO queue. For example, the requests received during time window T1 can be stored in the queue 206 first, such that when the throttler 212 retrieves the queued requests, the earliest requests are retrieved first and removed from the queue 206. Similarly, requests received during time window T2 can be stored in the queue 206 to be retrieved after the requests corresponding to time window T1. The queue 206 may be sized appropriately to store a sufficient number of requests for throttling based on the speed at which requests are removed by throttler 212 and the rate at which requests 201 are received by aggregator 204. For example, the queue 206 may store requests for two, three, or more time windows. Because the received requests 201 may arrive in large bursts in a single time window, the queue can be large enough to store a number of requests exceeding a maximum historical request volume for the target software component.

The controller 208 can determine a throttled request rate 222 based on the received request rate 216 and a max request rate per time window 220 received from the rate converter 210. The controller 208 can include modules for computing a plurality of correction factors, including a proportional correction, an integral correction, and a smoothed correction. Specific details of the controller 208 are described below with respect to FIG. 3.

The rate converter 210 can obtain the request rate limit 218 and convert it into the max request rate per time window 220. The request rate limit 218 may be provided during an initial configuration of the throttler engine 202. In some embodiments, the request rate limit 218 may be provided by the target component (e.g., target component 114) or the distributed computing system (e.g., distributed computing system 110). In some other embodiments, the request rate limit 218 may be based upon historical traffic to the software component or other configuration of the software component, execution environment, or distributed computing system.

The throttler 212 can receive the throttled request rate 222. Based upon the throttled request rate 222, the throttler may identify one or more requests queued in queue 206 to pass to the software component as throttled requests 224. Requests not passed to the software component may be dropped as dropped requests 221. Dropped requests 221 may be handled by the distributed computing system by providing an indication to the requesting customer that one or more requests were dropped or prompting a retry of the dropped request.

The throttled request rate 222 may correspond to a request rate per time window. For example, the throttled request rate 222 may indicate a number of requests in the queue 206 corresponding to time window T1 that should be passed to the software component. Based on the throttled request rate 222, the throttler 212 can pass the determined number of requests to the software component. In some embodiments, the throttler 212 may retrieve the first requests in the queue that correspond to the number of requests. For example, if the throttled request rate 222 indicates that 20 requests for time window T1, and the queue 206 stores 40 requests for time window T1, then the throttler 212 may retrieve the first 20 requests from the queue 206 and pass them to the software component as throttled requests 224. The next 20 requests can then be removed from the queue 206 and dropped as dropped requests 221. In other embodiments, the throttler 212 can select which of the requests to pass and which to drop. For example, the throttler 212 could pass 10 requests, drop 10, pass 10, and drop 10. Several additional selection combinations are possible.

The throttler engine 202 can also include a tuning module 214. The tuning module 214 may be configured to tune one or more parameters of the throttler engine 202, including a plurality of weights used by the controller 208 to compute the plurality of corrections to determine the throttled request rate. As discussed in further detail with respect to FIG. 4, the tuning module 214 can use hyperparameter tuning to determine optimal weights for the controller 208 based on a predicted received request rate or other input training data. In addition, the tuning module can detect a drift between the received request rate and the predicted request rate during real-time operation, such that the tuning module 214 can re-tune the plurality of weights while the throttler engine 202 is operating.

Figure 3:
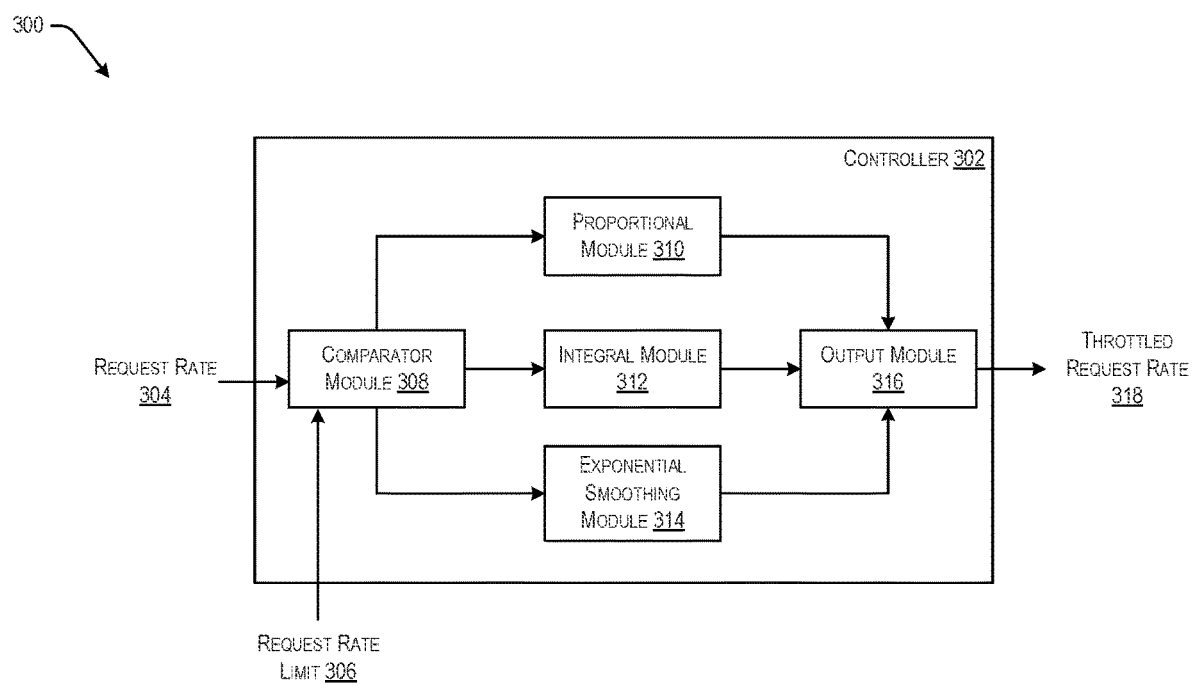
FIG. 3 is another block diagram of a controller module of a throttler engine according to some embodiments.

FIG. 3 depicts a controller 302 of a throttler engine (e.g., throttler engine 202), according to some embodiments. Controller 302 may be similar to controller 208 of FIG. 2. The controller 302 can include a comparator module 308, a proportional module 310, an integral module 312, an exponential smoothing module 314, and an output module 316. The controller 302 can receive as inputs a request rate 304 and a request rate limit 306, which may be similar to request rate 216 and max request rate per time window 220.

For each time window, the comparator module 308 computes a difference between the request rate 304 and the request rate limit 306. This difference may be a positive value or a negative value. In some embodiments, the request rate limit 306 may not change for each successive time window, while the request rate 304 may be different for each time window based on the received requests during that time window. In some other embodiments, a change to the software component or the distributed computing system infrastructure may result in a change to the request rate limit. The computed difference for each time window may be stored by the controller 302 for use in subsequent computations.

The proportional module 310 can receive the computed difference and compute a proportional correction. The proportional correction may be represented as $C_P = K_P \cdot E(t)$. The computed difference is $E(t)$. The proportional weight $K_P$ can be determined during the tuning of the controller 302.

The integral module 312 can receive the computed difference $E(t)$ and compute an integral correction. The integral correction may be represented as $C_I = K_I \int_0^t E(\tau) d\tau$, where $K_I$ is the integral weight, which may be determined during the tuning of the controller 302. Numerical integration techniques may be used to compute the integral based on the current difference E(t) and one or more prior differences E(t−1), E(t−2), etc. For example, the integral over the previous three time windows can be approximated as $$C_I = \frac{\Delta T}{6}(E(t) + 4 \cdot E(t-1) + E(t-2)),$$

where ΔT is the total time of the previous three time windows (the well-known Simpson's rule). Other integration techniques may be employed, including more sophisticated adaptive algorithms for the embodiments where the time window length varies.

The exponential smoothing module 314 can receive the computed difference E(t) and compute a smoothed correction. The smoothed correction may be represented as $C_{ES}(t+1) = \alpha \cdot E(t) + \alpha(1-\alpha) \cdot E(t-1) + \alpha(1-\alpha)^2 \cdot E(t-2) + \ldots$ As with the other weights, the smoothed weight a can also be determined when tuning the controller 302. The number of terms used to compute the smoothing correction may vary depending on the configuration of the controller 302. The stored differences computed by the comparator module 308 can be used to compute additional terms of the smoothed correction. Additionally, other methods of exponential smoothing are contemplated that have more than one smoothed weight, including, for instance, double exponential smoothing that includes two weight parameters.

The output module 316 can receive one or more of the proportional correction, the integral correction, and the smoothed correction and compute the throttled request rate 318. For example, the throttled request rate may be represented as $R_T(t) \propto C_P(t) + C_I(t) - C_{ES}(t+1)$. The throttled request rate 318 may not exceed the request rate limit 306. If the difference between the request rate 304 and the request rate limit 306 is 0 for the time window, then the proportional correction will be zero while the integral correction and the smoothed correction will have no contribution from the current time window. However, past differences may contribute to the integral correction term and the exponential smoothing term. Positive values of the difference (request rate limit 306 minus request rate 304) indicate that the received request rate at that time window is less than the request rate limit, —such that throttled request rate 318 may be equal to the request rate 304. If the smoothed correction indicates that the future difference (request rate limit 306 minus request rate 304) will be positive, then the throttled request rate may be set equal to request rate 304. Conversely, if the smoothed correction indicates that the future difference will be negative (e.g., the next time window request rate will exceed the request rate limit 306, then the throttled request rate 318 can be reduced at the current time window.

Figure 4:
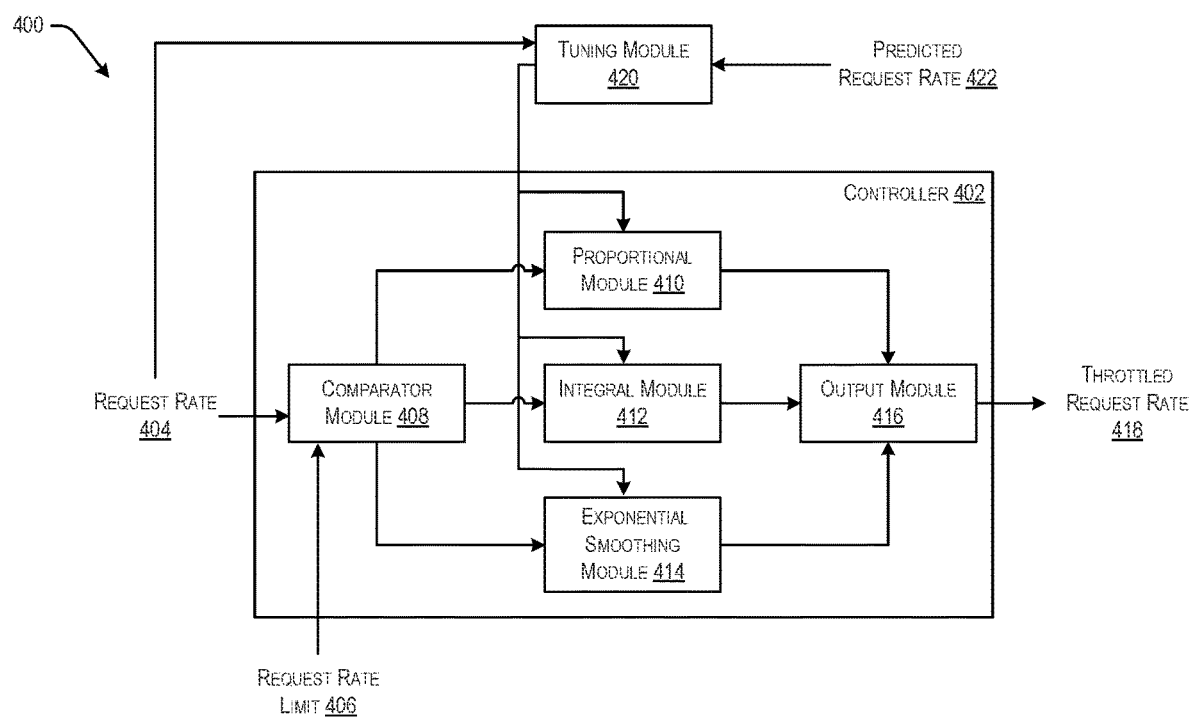
FIG. 4 is a block diagram depicting a controller module and a tuning module of a throttler engine, according to some embodiments.

FIG. 4 depicts a controller 402 and a tuning module 420 of a throttler engine, according to some embodiments. The controller 402 may be similar to controller 302 of FIG. 3. Similarly, the throttler engine may be any of the throttler engines described herein. The controller 402 can include comparator module 408, proportional module 410, integral module 412, exponential smoothing module 414, and output module 416, all of which may be similar to the corresponding elements described with respect to FIG. 3.

The tuning module 420 can receive the request rate 404 as well as a predicted request rate 422. The predicted request rate 422 may be based on historical request traffic to a software component. In some embodiments, the predicted request rate 422 is simulated. The tuning module 420 can tune one or more parameters of the controller 402 to provide an improved or optimal configuration of one or more of the modules 410-414. The tuning module 420 can tune the controller 402 as part of an initial configuration, before the throttler engine is implemented. The tuning module 420 can also be used to re-tune the controller 402 while the controller is actively providing throttling to a software component.

When tuning the controller 402 initially, the tuning module 420 can use the predicted request rate and the request rate limit of the software component to perform hyperparameter tuning to determine values for the plurality of weights associated with the proportional module 410, the integral module 412, and the exponential smoothing module 414. For example, the hyperparameter tuning can include a grid search over the domain of possible weight values for each of the plurality of weights. In a grid search, a large number of possible values for the plurality of weights are selected, one at a time, and used to compute an output (e.g., a simulated throttled request rate) using simulated inputs (e.g., the predicted request rate 422, an initial tuning request rate, historical request rate data, etc.). The combination of weight values that provides an optimal or desired output may then be selected to configure the modules 410-414.

Once tuned, the controller 402 may continue to provide stable and accurate throttled request rates for the throttler engine for most received request traffic and may not need additional tuning. In some embodiments, the tuning module 420 can detect a drift in the received request rate and the predicted request rate 422 on which the controller 402 was previously (or initially) tuned. The drift can be a change in a deviation between the predicted request rate and the received request rate at a first time window T1 and a subsequent deviation between the predicted request rate and a second received request rate at a second time window T2. The deviation can be a difference or other comparison of the received request rate and the predicted request rate. More generally, the deviation can represent a quantitative measure (e.g., an average value, variance, or other computed representation) of received request traffic compared to predicted request traffic for a software component. If the deviation exceeds a threshold, then the tuning module can re-tune the controller 402. The threshold can correspond to a desired limit on the deviation.

In some embodiments, detecting that the drift has exceeded a threshold is handled by another module or process of the throttler engine. In other embodiments, the tuning module 420 may receive an indication to re-tune the controller 402 (e.g., at specified intervals or in response to certain changes in the distributed computing system). For example, the distributed computing system may onboard additional tenants that may lead to significant changes in the request traffic targeting the software component. In response to this change in the distributed computing system, the tuning module 420 can receive an indication to re-tune the controller 402 based on the predicted changes to the request traffic.

Re-tuning the controller 402 can occur while the throttler engine and the controller 402 are actively providing throttling for the software component. The tuning module 420 may use the current request rate or other stored request traffic information (e.g., stored differences) to perform a subsequent hyperparameter tuning. The tuning module 420 may make use of compute resources of the distributed computing system to perform the tuning operations. Newly determined weight values can be configured for the modules 410-414 without incurring downtime of the controller 402 or the throttler engine, providing significant advantages over conventional techniques that cannot automatically adapt their configurations in response to changes in request traffic.

Figure 5:
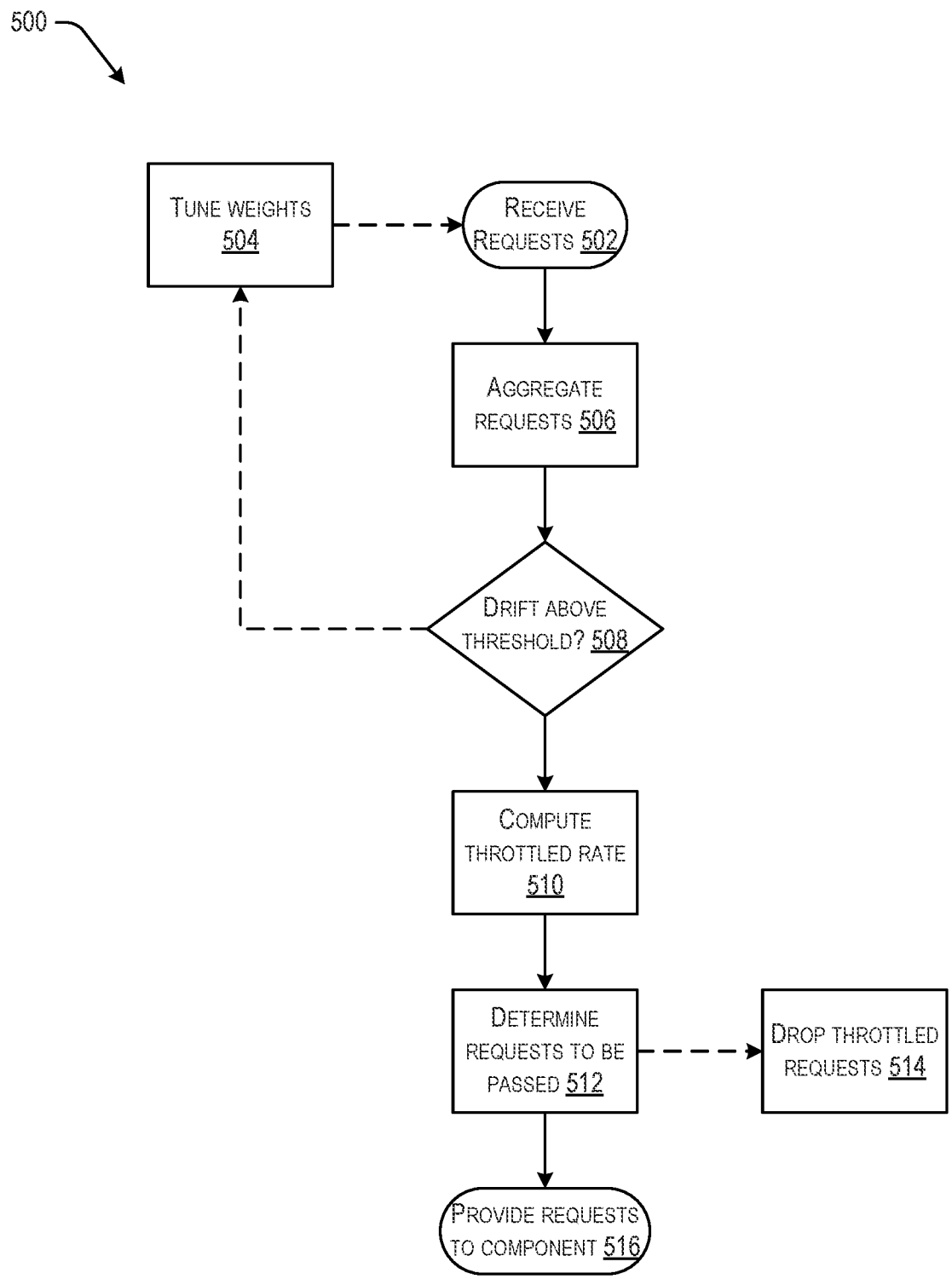
FIG. 5 is a simplified flow diagram illustrating an example process for throttling requests to a software component by a throttler engine.

FIG. 5 is a simplified flow diagram illustrating an example process 500 for throttling requests to a software component by a throttler engine, according to some embodiments. The throttler engine may be a throttler engine in a distributed computing system, including any of the throttler engines described herein, including throttler engine 112 of FIG. 1 and throttler engine 202 of FIG. 2. The process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some, any, or all of the process 500 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Process 500 begins at block 502 with the receipt of a plurality of requests at the throttler engine. The requests may target a software component of the distributed computing system. The throttler engine may be tuned initially at block 504. The tuning of the plurality of weights used to compute the proportional, integral, and smoothed corrections may be done by a hyperparameter technique or other suitable machine learning technique.

At block 506, the throttler engine aggregates the received requests into a queue based on a first time window. The throttler engine can determine a received request rate based on the number of requests received during the time window and the length of the time window.

At decision 508, the throttler engine can determine if the received requests deviate from a predicted request rate by more than a threshold. If so, the throttler engine can begin performing a re-tuning operation at 504, which can be completed prior to a subsequent iteration of the process 500. If the detected drift does not exceed the threshold, the throttler engine can then compute a throttled request rate, at block 510. Computing the throttled request rate can include computing a proportional correction, an integral correction, and a smoothed correction, each associated with at least one weight. One, two, or all three of the corrections can be combined to obtain the throttled request rate.

At block 512, the throttler engine can identify, based on the throttled request rate, one or more of the queued requests to pass to the software component. In some embodiments, the passed requests can be the first requests in the queue that satisfy the throttled request rate. In other embodiments, the throttler engine may pass every other request, every third request, alternating sets of requests, or various combinations as it clears the queue. The requests that are not passed to the software component may be dropped, at block 514. Dropped requests may not be received by the software component. The throttler engine may not provide any handling or reporting of dropped requests to the requesting customer. Process 500 concludes at endpoint 516 with the identified requests passed to the software component.

Figure 6:
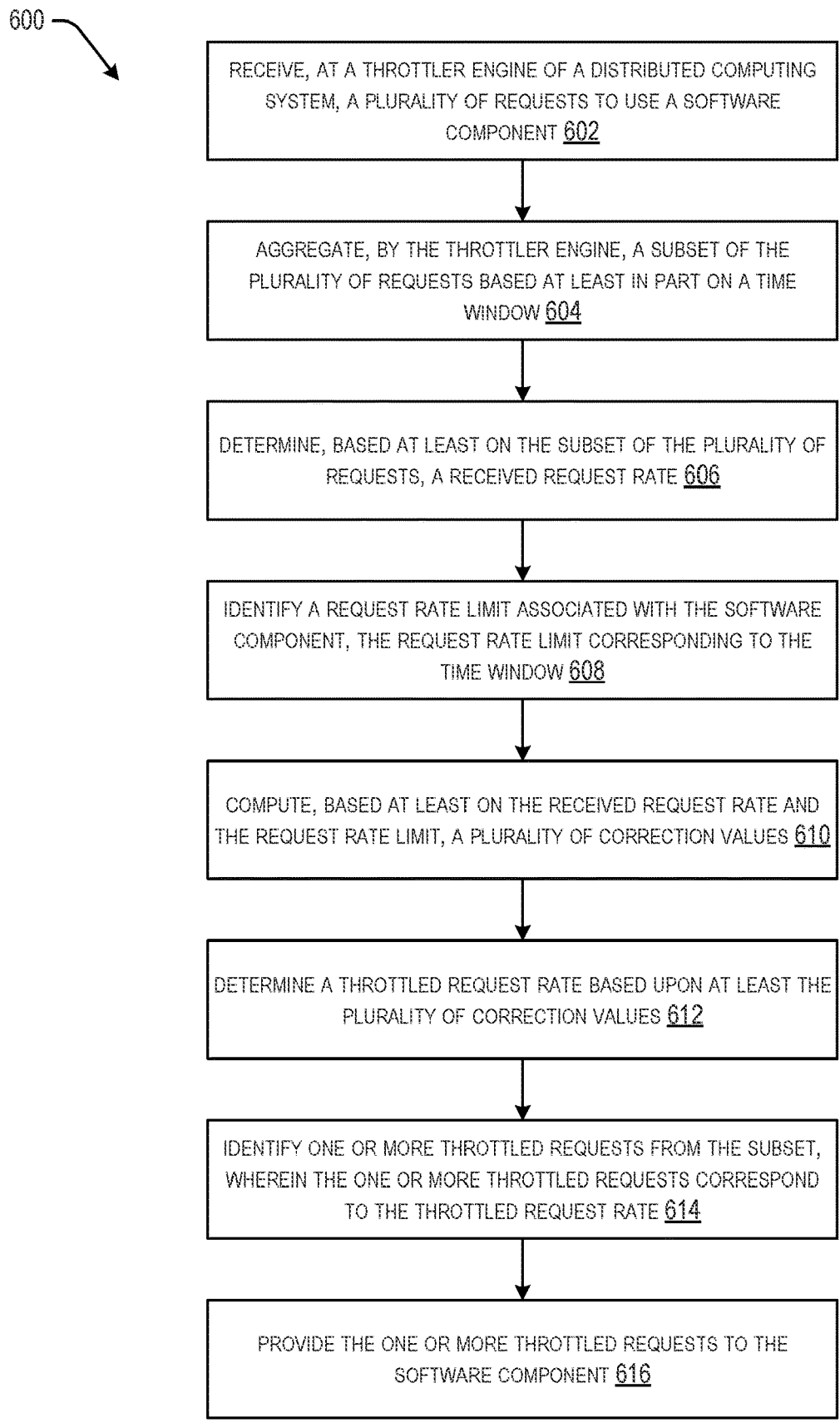
FIG. 6 illustrates a process flow performed by a throttler engine in accordance with some embodiments.

FIG. 6 illustrates a process flow 600 performed by a throttler engine in accordance with some embodiments. The throttler engine may be similar to any of the throttler engines described herein. Process 600 may begin at block 602 with the throttler engine receiving a plurality of requests to use a software component. The requests can include any type of request to access, use, or otherwise interact with the software component. Each request can include a request time that identifies the time that each request was made. In some embodiments, the request time is the time at which the request is received at the throttler engine.

At block 604, the throttler engine can aggregate a subset of the plurality of received requests into a queue. The aggregation can be based on a time window. The time window can have a specified length. The request times of requests in the subset fall within the time window, such that the aggregated subset of requests all have request times within the time window. In other words, the subset of requests are received during the time window and placed into the queue. In some embodiments, the queue is a FIFO. The first requests queued will be the first requests retrieved and removed from the queue.

The throttler engine can aggregate subsequent requests into the queue. The throttler engine may aggregate a second subset of the plurality of requests based on a second time window. The request times of the requests in the second subset can correspond to the time window. The second subset may be placed into the queue after the first subset.

At block 606, the throttler engine can determine a received request rate. The received request rate can be the number of requests received during the time window divided by the length of the time window. The received request rate may differ from other request rates of the incoming requests, including an instantaneous request rate. The throttler engine may also determine a second received request rate corresponding to the second time window. The throttler engine can also identify a request rate limit associated with the software component, at block 608. The request rate limit may be a static value. In some embodiments, the request rate limit can be provided to the throttler engine by the software component or by the distributed computing system. In other embodiments, the request rate limit is part of the initial configuration of the throttler engine.

At block 610, the throttler engine can compute a plurality of correction values corresponding to a plurality of weights. The correction values can include a proportional correction value, an integral correction value, and a smoothed correction value. The plurality of correction values can be computed based on the received request rate and the request rate limit. Computing the correction values may include computing a first difference between the received request rate and the request rate limit and multiplying it by a proportional weight of the plurality of weights. Computing the correction values may also include computing a second difference between the second received request rate and the request rate limit. The first difference and the second difference can be used in conjunction with an integral weight of the plurality of weights to compute an integral correction value. Similarly, the first and second differences can be used in conjunction with a smoothed weight of the plurality of weights to compute a smoothed correction value. Additional differences between requests received during later time windows can be used to improve the integral and exponential smoothing computations.

The plurality of weights may be predetermined values, or they can be tuned based on a predicted request rate. The tuning can occur during the initial implementation of the throttler engine, and can be performed additional times during the lifetime of the throttler engine. For re-tuning, the throttler engine can detect a drift in a deviation between the predicted request rate and the received request rate and a subsequent deviation between the predicted request rate and the second received request rate. If the drift exceeds a threshold, the throttler engine can begin the re-tuning process. The tuning can include hyperparameter tuning, with the values of the plurality of weights determined using a grid search or other technique for optimizing or improving parameter values by simulation. If re-tuning occurs, the throttler engine can determine a new predicted request rate based upon the subsequent deviation (e.g., update the predicted request rate based on the received request rate that triggered the re-tuning).

At block 612, the throttler engine may determine a throttled request rate. The throttled request rate can be based on the plurality of correction values. In some embodiments, the throttled request rate is proportional to the sum of the plurality of correction values. Additionally, the throttled request rate can include one, two, or all three of the proportional correction value, the integral correction value, and the smoothed correction value.

Based on the throttled request rate, the throttler engine can identify one or more of the requests in the queued subset, at block 614. Depending on the length of the time window, the throttled request rate may correspond to a fixed number of requests to be retrieved from the subset in the queue and passed to the software component. The throttler engine can identify the first requests in the queue that satisfy this fixed number. In some embodiments, the throttler engine may identify alternating groups of requests to pass to the software component. Requests not passed to the software component may be dropped. Finally, at block 616 the throttler engine can provide the one or more throttled requests to the software component.

In addition to the throttled requests provided from the queued subset, the throttler engine can update the plurality of correction values based on the requests received during the second time window and additional subsequent time windows. The updated correction values can then be used to update the throttled request rate. The throttler engine can use the updated throttled request rate to identify additional throttled requests from the second subset to provide to the software component.

Example Infrastructure as a Service Architectures

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to first be set up. In some instances, the provisioning can be done manually, a provisioning tool may be utilized to provision the resources, and/or deployment tools may be utilized to deploy the code once the infrastructure is provisioned.

Figure 7:
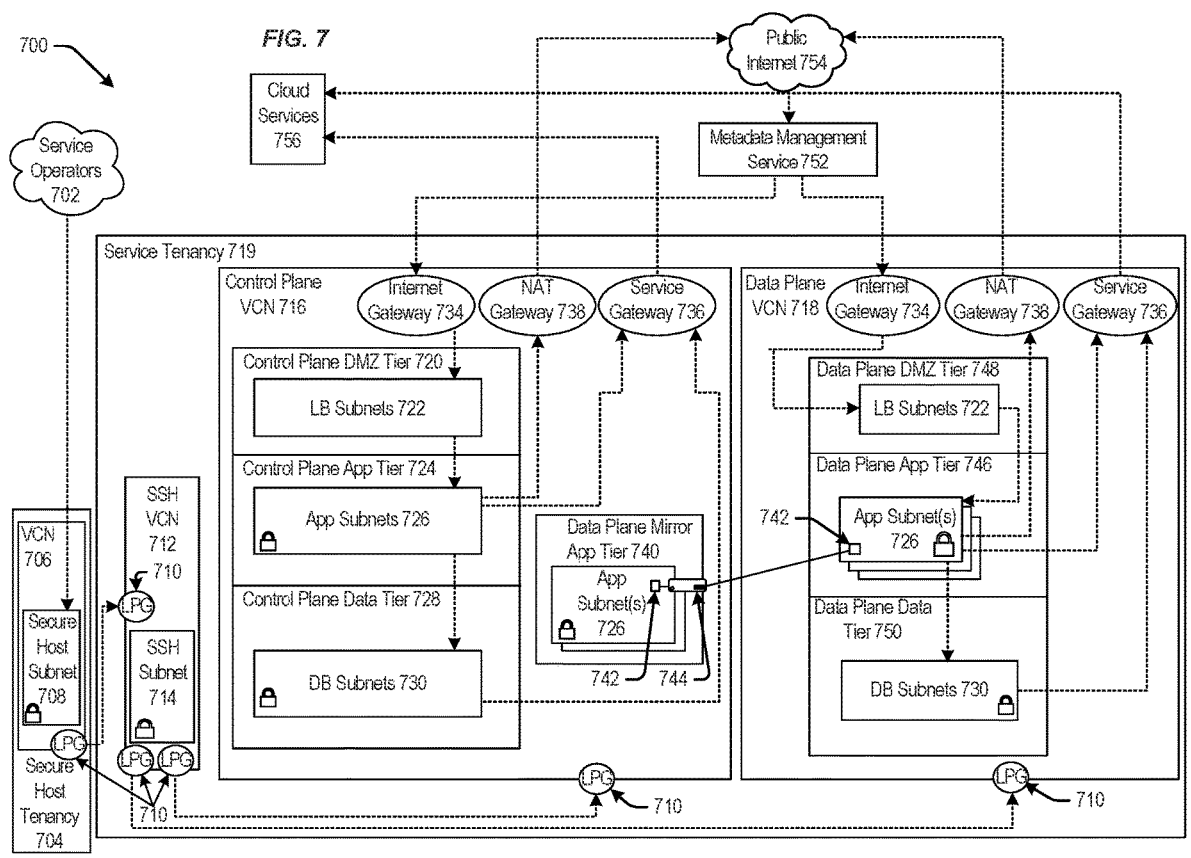
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
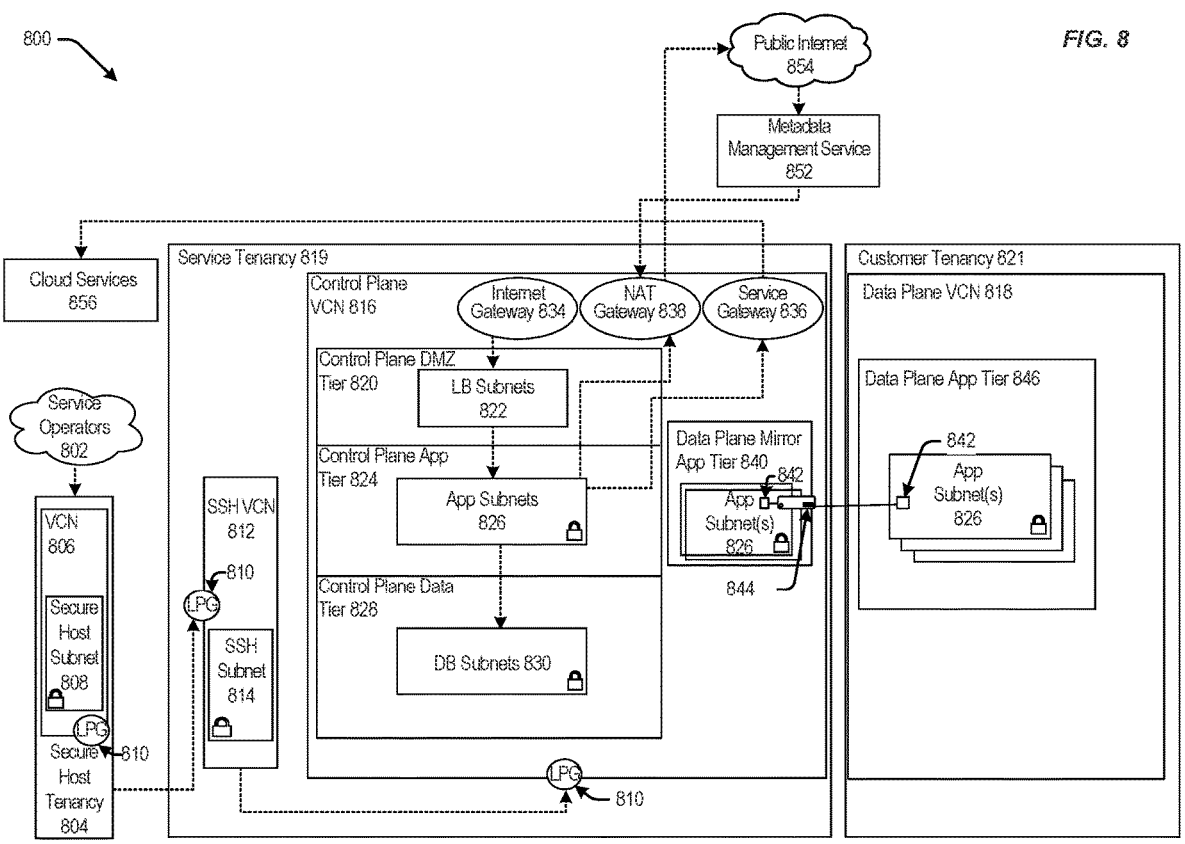
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
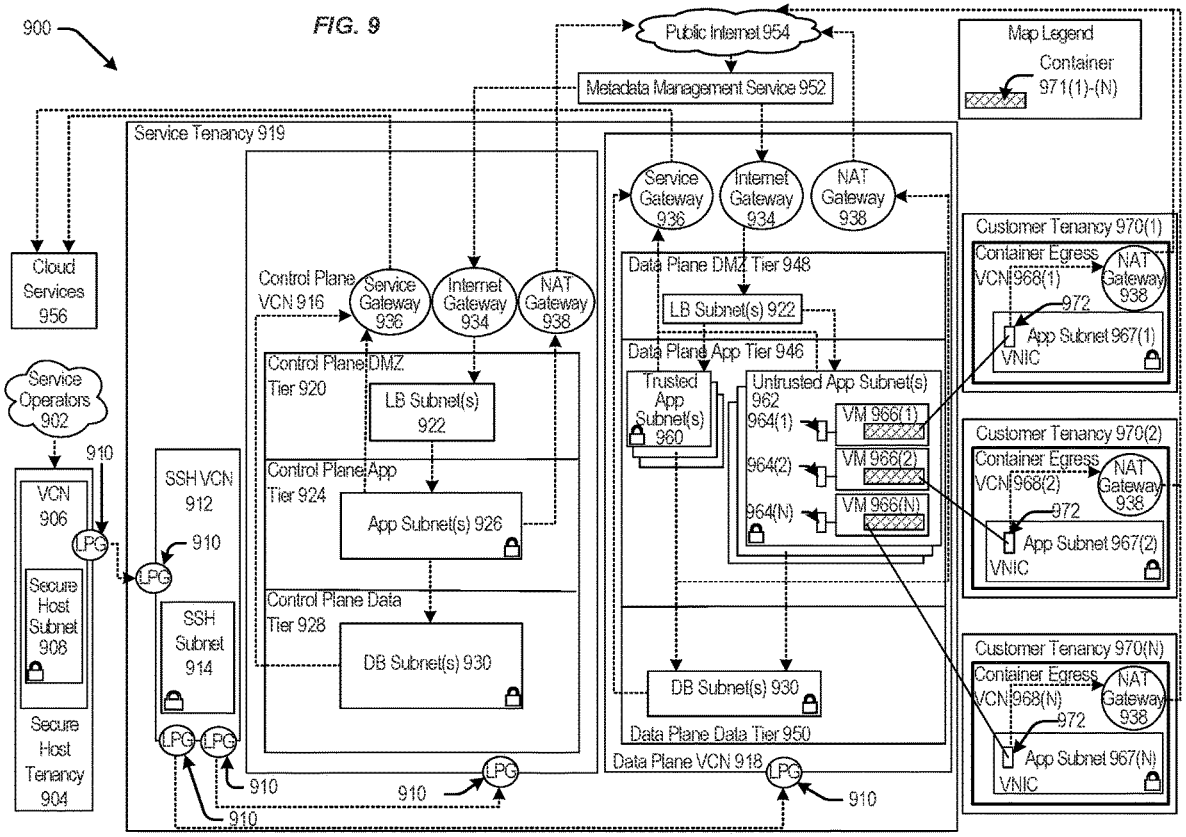
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e g similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the entrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
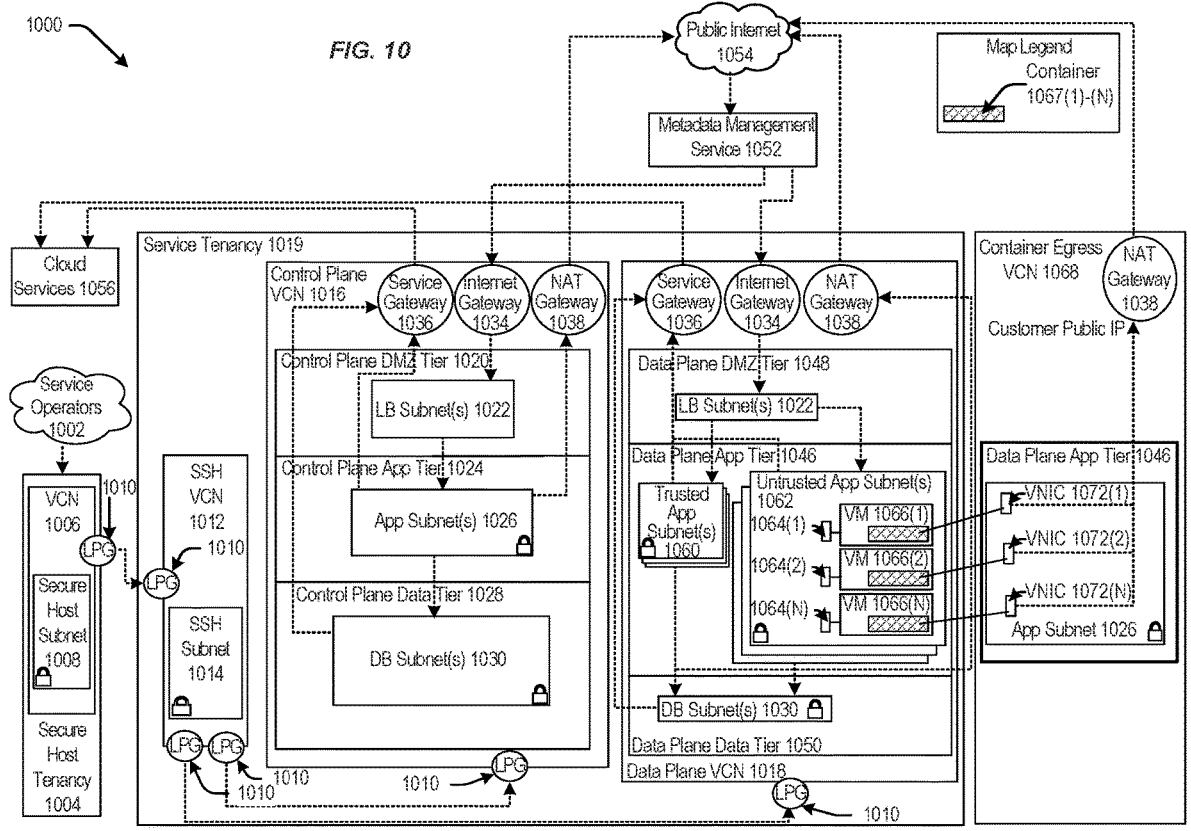
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
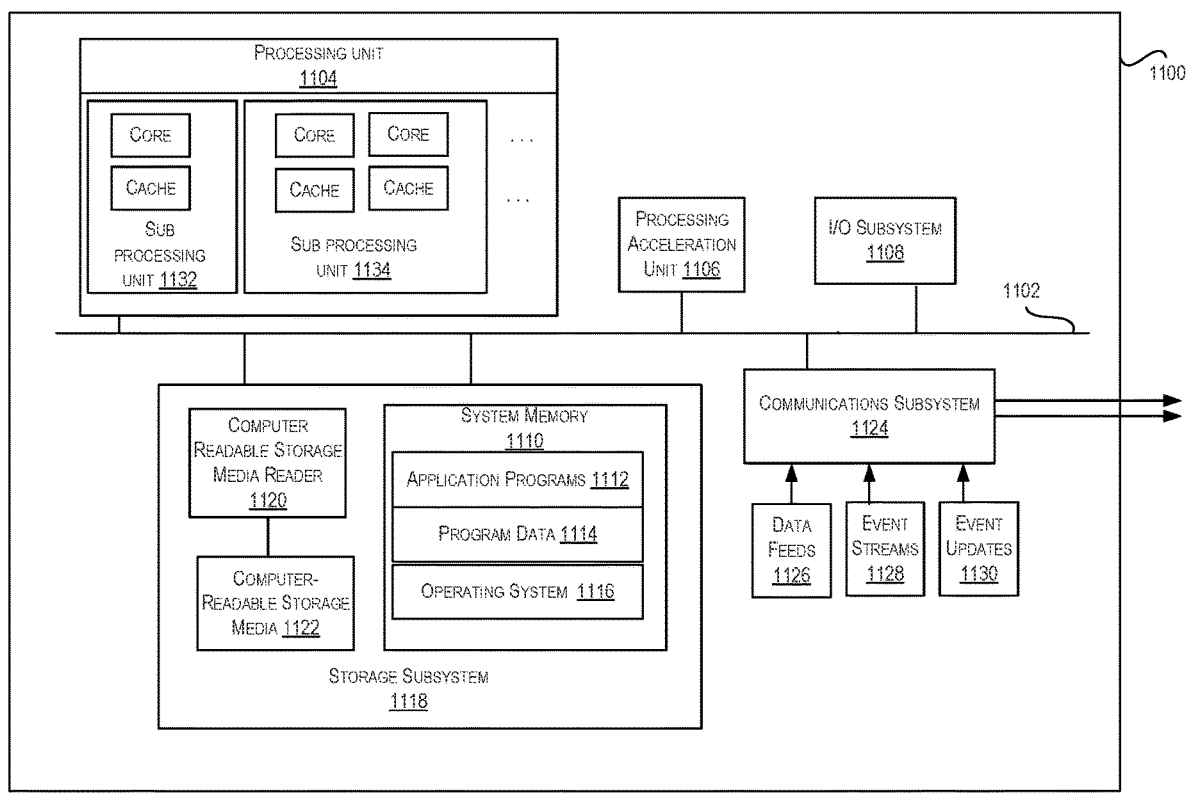
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   receiving, at a throttler engine of a distributed computing system, a plurality of requests to use a software component, each request of the plurality of requests associated with a request time;
   aggregating, by the throttler engine, a subset of the plurality of requests based at least in part on a time window, wherein the request time of each of the requests in the subset corresponds to the time window, and wherein the subset is aggregated into a queue;
   determining, based at least in part on the subset of the plurality of requests, a received request rate;
   identifying a request rate limit associated with the software component, the request rate limit corresponding to the time window;
   tuning a plurality of weights;
   computing, based at least in part on the received request rate, the request rate limit and the plurality of weights, a plurality of correction values;
   determining a throttled request rate based at least in part on the plurality of correction values;
   identifying one or more throttled requests from the subset, the one or more throttled requests corresponding to the throttled request rate; and
   providing the one or more throttled requests to the software component,
   wherein tuning the plurality of weights comprises:
      detecting (i) a deviation between a predicted request rate and the received request rate and (ii) a previous deviation between the predicted request rate and a previous received request rate, wherein a drift corresponds to a difference between the deviation and the previous deviation; and
      responsive to detecting the drift exceeding a threshold, re-tuning the plurality of weights by simulating, by the throttler engine, the throttled request rate using a new predicted request rate.

2. The computer-implemented method of claim 1, further comprising:
   aggregating a second subset of the plurality of requests based at least in part on a second time window, the request times of each of the requests in the second subset corresponding to the second time window, the second subset aggregated into the queue;
   determining, based at least in part on the second subset, a second received request rate corresponding to the second time window;
   updating, based at least in part on the second received request rate, the plurality of correction values;
   updating the throttled request rate based at least in part on the updated plurality of correction values;
   identifying additional throttled requests from the second subset, the additional throttled requests corresponding to the updated throttled request rate; and
   providing the additional throttled requests to the software component.

3. The computer-implemented method of claim 2, wherein computing the plurality of correction values comprises:
   computing a proportional correction value based at least in part on a first difference between the received request rate and the request rate limit, the proportional correction value comprising a proportional weight;
   computing an integral correction value based at least in part on the first difference and a second difference between the second received request rate and the request rate limit, the integral correction value comprising an integral weight; and
   computing a smoothed correction value based at least in part on the first difference and the second difference, the smoothed correction value comprising a smoothed weight.

4. The computer-implemented method of claim 1, further comprising:
   determining the new predicted request rate based at least in part on the previous deviation.

5. The computer-implemented method of claim 1, wherein the plurality of weights tuned using hyperparameter tuning comprises predetermined values.

6. The computer-implemented method of claim 1, wherein the queue comprises a first-in first-out queue.

7. The computer-implemented method of claim 1, wherein the request rate limit comprises a static request rate limit.

8. The computer-implemented method of claim 1, wherein tuning the plurality of weights further comprises using hyperparameter tuning and performing a grid search.

9. The computer-implemented method of claim 1, wherein the predicted request rate is based at least in part on historical request traffic to the software component.

10. The computer-implemented method of claim 1, wherein the previous received request rate is determined based at least in part on previous requests received during a previous time window preceding the time window.

11. A distributed computing system comprising:
one or more processors; and
one or more memories storing computer-executable instructions that, when executed with the one or more processors, cause the distributed computing system to:
receive, at a throttler engine of the distributed computing system, a plurality of requests to use a software component, each request of the plurality of requests associated with a request time;
aggregate, by the throttler engine, a subset of the plurality of requests based at least in part on a time window, wherein the request time of each of the requests in the subset corresponds to the time window, and wherein the subset is aggregated into a queue;
determine, based at least in part on the subset of the plurality of requests, a received request rate;
identify a request rate limit associated with the software component, the request rate limit corresponding to the time window;
tune a plurality of weights;
compute, based at least in part on the received request rate, the request rate limit and the plurality of weights, a plurality of correction values;
determine a throttled request rate based at least in part on the plurality of correction values;
identify one or more throttled requests from the subset, wherein the one or more throttled requests correspond to the throttled request rate; and
provide the one or more throttled requests to the software component,
wherein tuning the plurality of weights comprises:
detecting (i) a deviation between a predicted request rate and the received request rate and (ii) a previous deviation between the predicted request rate and a previous received request rate, wherein a drift corresponds to a difference between the deviation and the previous deviation; and
responsive to detecting the drift exceeding a threshold, re-tuning the plurality of weights by simulating, by the throttler engine, the throttled request rate using a new predicted request rate.

12. The distributed computing system of claim 11, wherein executing the computer-executable instructions further causes the distributed computing system to:
aggregate a second subset of the plurality of requests based at least in part on a second time window, the request times of each of the requests in the second subset corresponding to the second time window, the second subset aggregated into the queue;
determine, based at least in part on the second subset, a second received request rate corresponding to the second time window;
update, based at least in part on the second received request rate, the plurality of correction values;
update the throttled request rate based at least in part on the updated plurality of correction values;
identify additional throttled requests from the second subset, the additional throttled requests corresponding to the updated throttled request rate; and
provide the additional throttled requests to the software component.

13. The distributed computing system of claim 12, wherein computing the plurality of correction values comprises:
computing a proportional correction value based at least in part on a first difference between the received request rate and the request rate limit, the proportional correction value comprising a proportional weight;
computing an integral correction value based at least in part on the first difference and a second difference between the second received request rate and the request rate limit, the integral correction value comprising an integral weight; and
computing a smoothed correction value based at least in part on the first difference and the second difference, the smoothed correction value comprising a smoothed weight.

14. The distributed computing system of claim 11, wherein executing the computer-executable instructions further causes the distributed computing system to:
determine the new predicted request rate based at least in part on the previous deviation.

15. The distributed computing system of claim 11, wherein tuning the plurality of weights further comprises using hyperparameter tuning and performing a grid search.

16. The distributed computing system of claim 11, wherein the predicted request rate is based at least in part on historical request traffic to the software component.

17. The distributed computing system of claim 11, wherein the previous received request rate is determined based at least in part on previous requests received during a previous time window preceding the time window.

18. A non-transitory computer readable medium storing computer-executable instructions that, when executed by one or more processors, cause a distributed computing system to at least:
receive, at a throttler engine of the distributed computing system, a plurality of requests to use a software component, each request of the plurality of requests associated with a request time;
aggregate, by the throttler engine, a subset of the plurality of requests based at least in part on a time window, wherein the request time of each of the requests in the subset corresponds to the time window, and wherein the subset is aggregated into a queue;
determine, based at least in part on the subset of the plurality of requests, a received request rate;
identify a request rate limit associated with the software component, the request rate limit corresponding to the time window;
tune a plurality of weights;
compute, based at least in part on the received request rate, the request rate limit, and the plurality of weights, a plurality of correction values;
determine a throttled request rate based at least in part on the plurality of correction values;
identify one or more throttled requests from the subset, wherein the one or more throttled requests correspond to the throttled request rate; and
provide the one or more throttled requests to the software component,
wherein tuning the plurality of weights comprises:
detecting (i) a deviation between a predicted request rate and the received request rate and (ii) a previous deviation between the predicted request rate and a previous received request rate, wherein a drift corresponds to a difference between the deviation and the previous deviation; and
responsive to detecting the drift exceeding a threshold, re-tuning the plurality of weights by simulating, by the throttler engine, the throttled request rate using a new predicted request rate.

19. The non-transitory computer readable medium of claim 18, wherein executing the computer-executable instructions further causes the distributed computing system to:
- aggregate a second subset of the plurality of requests based at least in part on a second time window, the request times of each of the requests in the second subset corresponding to the second time window, the second subset aggregated into the queue;
- determine, based at least in part on the second subset, a second received request rate corresponding to the second time window;
- update, based at least in part on the second received request rate, the plurality of correction values;
- update the throttled request rate based at least in part on the updated plurality of correction values;
- identify additional throttled requests from the second subset, the additional throttled requests corresponding to the updated throttled request rate; and
- provide the additional throttled requests to the software component.

20. The non-transitory computer readable medium of claim 19, wherein computing the plurality of correction values comprises:
- computing a proportional correction value based at least in part on a first difference between the received request rate and the request rate limit, the proportional correction value comprising a proportional weight;
- computing an integral correction value based at least in part on the first difference and a second difference between the second received request rate and the request rate limit, the integral correction value comprising an integral weight; and
- computing a smoothed correction value based at least in part on the first difference and the second difference, the smoothed correction value comprising a smoothed weight.

* * * * *